United States Patent [19]
Yoon

[11] Patent Number: 5,835,148
[45] Date of Patent: *Nov. 10, 1998

[54] APPARATUS FOR PARALLEL DECODING OF DIGITAL VIDEO SIGNALS

[75] Inventor: Jae-Soo Yoon, Seoul, Rep. of Korea

[73] Assignee: Daewoo Electronics Co., Ltd., Seoul, Rep. of Korea

[ * ] Notice: The term of this patent shall not extend beyond the expiration date of Pat. No. 5,646,690.

[21] Appl. No.: 869,698

[22] Filed: Jun. 5, 1997

Related U.S. Application Data

[63] Continuation of Ser. No. 490,411, Jun. 14, 1995, Pat. No. 5,646,690.

[30] Foreign Application Priority Data

Jun. 14, 1994 [KR] Rep. of Korea ...................... 94-13293

[51] Int. Cl.⁶ ..................................................... H04N 7/50
[52] U.S. Cl. ........................................... 348/416; 348/716
[58] Field of Search ................................... 348/413, 416, 348/714, 716, 718; H04N 7/50

[56] References Cited

U.S. PATENT DOCUMENTS

| | | | |
|---|---|---|---|
| 5,130,797 | 7/1992 | Murakami | 348/416 |
| 5,170,259 | 12/1992 | Niihara | 348/415 |
| 5,267,334 | 11/1993 | Normille | 348/409 |
| 5,379,070 | 1/1995 | Retter | 348/403 |
| 5,448,310 | 9/1995 | Kopet | 348/699 |
| 5,459,516 | 10/1995 | Song | 348/402 |
| 5,469,214 | 11/1995 | Bazzaz | 348/416 |
| 5,510,842 | 4/1996 | Phillips | 348/416 |

*Primary Examiner*—Howard Britton
*Attorney, Agent, or Firm*—Anderson, Kill & Olick, P.C.

[57] ABSTRACT

An apparatus for decoding an encoded digital video signal for the reproduction of an original video image signal comprises an image data partitioning circuit for dividing difference pixel values on the basis of the current macro block into four equal-sized current subblocks, motion compensation units and a formatter for providing predicted current macro block data, adders for providing the reconstructed current macro block signals by combining the predicted current macro block data and the difference pixel data. The motion compensation units have four memories for storing the reconstructed current macro block signals as the divided previous subblock data.

10 Claims, 7 Drawing Sheets

FIG.8A

| V4h4 \ BN0 BN1 | 00 | 01 | 10 | 11 |
|---|---|---|---|---|
| 00 | 00 | 00 | 00 | 00 |
| 01 | (01) | 00 | 01 | 00 |
| 10 | 10 | 10 | 00 | 00 |
| 11 | 11 | 10 | 01 | 00 |

FIG.8B

| V4h4 \ BN0 BN1 | 00 | 01 | 10 | 11 |
|---|---|---|---|---|
| 00 | 11 | 10 | 01 | 00 |
| 01 | (10) | 11 | 00 | 01 |
| 10 | 01 | 00 | 11 | 10 |
| 11 | 00 | 01 | 10 | 11 |

APPARATUS FOR PARALLEL DECODING OF DIGITAL VIDEO SIGNALS

This is a continuation of application Ser. No. 08 490,411 filed Jun. 14, 1995 now U.S. Pat. No. 5,646,690.

FIELD OF THE INVENTION

The present invention relates to a video imaging system; and, more particularly, to an improved video image decoding apparatus for decompressing incoming compressed video image data in parallel.

DESCRIPTION OF THE PRIOR ART

In various electronic/electrical applications such as high definition television and video telephone systems, an image signal may need be transmitted in a digitized form. When the image signal is expressed in a digitized form, there is bound to occur a substantial amount of digital data. Since, however, the available frequency bandwidth of a conventional transmission channel is limited, in order to transmit the image signal therethrough, the use of an image signal encoding apparatus becomes necessary to compress the substantial amounts of digital data.

Accordingly, most image signal encoding apparatus employ various compression techniques(or coding methods) built on the idea of utilizing or reducing spatial and/or temporal redundancies inherent in the input image signal.

Among the various video compression techniques, the so-called hybrid coding technique, which combines temporal and spatial compression techniques together with a statistical coding technique, is known to be most effective.

Most hybrid coding techniques employ a motion compensated DPCM(differential pulse code modulation), two-dimensional DCT(discrete cosine transform), quantization of DCT coefficients, and VLC (variable length coding). The motion compensated DPCM is a process of determining the movement of an object between a current frame and its previous frame, and predicting the current frame according to the motion flow of the object to produce a differential signal representing the difference between the current frame and its prediction. This method is described, for example, in Staffan Ericsson, "Fixed and Adaptive Predictors for Hybrid Predictive/Transform Coding", *IEEE Transactions on Communications, COM*-33, No. 12 (December 1985); and in Ninomiya and Ohtsuka, "A Motion Compensated Interframe Coding Scheme for Television Pictures", *IEEE Transactions on Communications, COM*-30, No. 1 (January 1982).

The two-dimensional DCT, which reduces or removes spatial redundancies between image data such as motion compensated DPCM data, converts a block of digital image data, for example, a block of 8×8 pixels, into a set of transform coefficient data. This technique is described in, e.g., Chen and Pratt, "Scene Adaptive Coder", *IEEE Transactions on Communications, COM*-32, No. 3 (March 1984). By processing such transform coefficient data with a quantizer, zigzag scanner and VLC circuit, the amount of data to be transmitted can be effectively compressed.

Specifically, in the motion compensated DPCM, current frame data is predicted from previous frame data based on an estimation of the motion between the current and the previous frames. Such estimated motion may be described in terms of two dimensional motion vectors representing the displacement of pixels between the previous and the current frames.

In order to compress the image signals with the above mentioned technique, the use of a processor capable of carrying out a high speed processing becomes necessary, and this is usually achieved by employing a parallel processing technique. Generally, in the image signal decoding apparatus having the parallel processing capability, one video image frame area is divided into a plurality of subframes, and image data within the video image frame area is processed on a subframe-by-subframe basis.

On the other hand, to determine a motion vector for a search block in the current frame, a similarity calculation is performed between the search block of the current frame and each of a plurality of equal-sized candidate blocks included in a generally larger search region within a previous frame, wherein the size of the search block typically ranges between 8×8 and 32×32 pixels. Consequently, the search region containing a boundary portion of any subframe also includes a boundary portion of a neighboring subframe. Accordingly, the motion estimation carried out by each processor requires a shared memory system with a multiple random access capability, resulting in an inefficient memory access.

SUMMARY OF THE INVENTION

It is, therefore, a primary object of the present invention to provide an improved video image decoding apparatus capable of carrying out a parallel processing by dividing a macro block into four subblocks, without having to use a shared memory system with a multiple random access capability.

In accordance with the present invention, there is provided an apparatus for decoding an encoded digital video signal for the reproduction of an original video image signal, wherein the encoded digital video signal includes encoded frame difference signals between the pixels in a current frame and the pixels in a previous frame, and encoded motion vectors, each of the current and the previous frames having a number of macro blocks and each of the motion vectors representing a spatial displacement between a macro block in the current frame and a corresponding matching point in the previous frame, which comprises: means for dividing a previous macro block included in the previous frame into four equal-sized previous subblocks; four memory means for storing the divided previous subblock data; means for decoding the encoded frame difference signals to thereby provide difference pixel values on a current macro block by macro block basis; means for dividing the difference pixel values for the current macro block into four equal-sized current subblocks; four first-in first-out(FIFO) buffers for storing the divided current subblock data; means for addressing said four memory means to derive predicted current macro block data therefrom in response to the motion vector for said current macro block; and means for providing the reconstructed current macro block signal by combining the predicted current macro block data and the difference pixel data from the FIFO buffers.

BRIEF DESCRIPTION OF THE DRAWINGS

The above and other objects and features of the present invention will become apparent from the following description of preferred embodiments given in conjunction with the accompanying drawings, in which:

FIGS. 8A and 8B constitute the tables for explaining an adjustment of motion vector address.

DETAILED DESCRIPTION OF THE PREFERRED EMBODIMENTS

The present invention provides for the communication of high definition television(HDTV) signals from a transmitter location to a population of receivers. At the transmitter of an "encoder" end of the communication link, digital video signals for successive frames of a television picture are encoded through the use of various coding methods known in the art. The inventive decoding apparatus includes four image processing modules, each of which has a processor dedicated to the processing of video data from a particular subblock.

Figure 1:
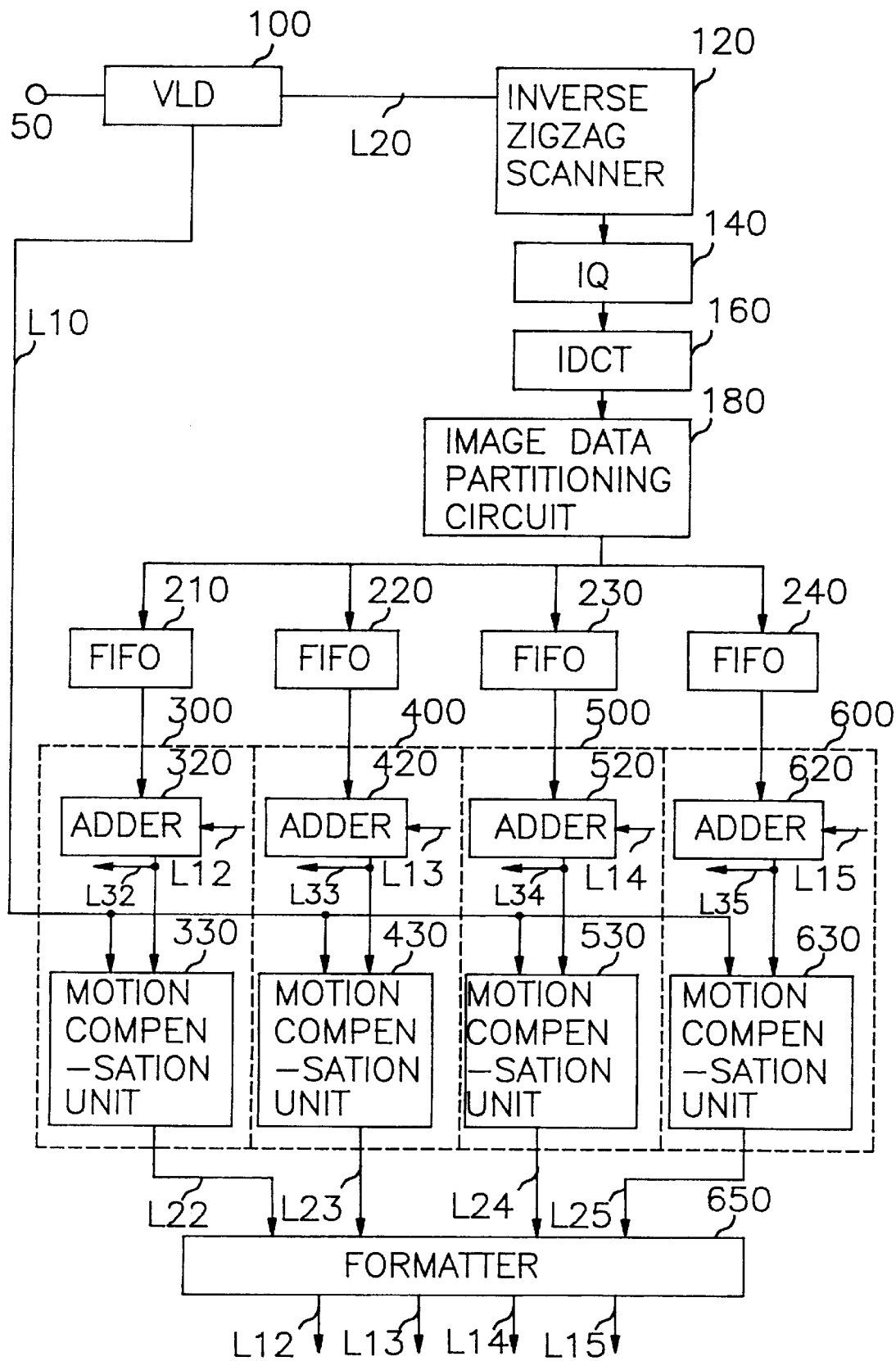
FIG. 1 is a block diagram of a video signal decoding apparatus in accordance with the present invention.

Referring to FIG. 1, there is shown a block diagram of the inventive parallel decoding apparatus, which comprises four image data processing modules 300 to 600. Each of the image data processing modules 300 to 600 has identical adders 320 to 620 and motion compensation units 330 to 630, each of the identical elements serving a same function.

As shown in FIG. 1, a variable length encoded digital video signal received from an encoding apparatus(not shown) is inputted via a terminal 50 to a variable length decoding(VLD) circuit 100. The encoded video signal includes a plurality of video frame data, each of said video frame data, occupying a video image frame area, has variable length coded transform coefficients and motion vectors. The variable length coded transform coefficients represent the difference data between a current frame and a previous frame, each of which has a same number of macro blocks.

The VLD circuit 100 decodes the variable length coded transform coefficients and the motion vectors to send the transform coefficient data to an inverse zigzag scanner 120 and the motion vector data to each of the motion compensation units 330 to 630, incorporated in the image data processing modules. The VLD circuit is basically a look-up table: that is, in the VLD circuit, a plurality of code sets is provided to define respective relationships between variable length codes and their run-length codes or motion vectors.

Video image data is provided from the VLD circuit 100 to the inverse zigzag scanner 120 through a line L20. In the inverse zigzag scanner 120, the quantized DCT coefficients are reconstructed to provide an original block of quantized DCT coefficients. A block of quantized DCT coefficients is converted into a set of DCT coefficients in an inverse quantizer(IQ) 140 and fed to an inverse discrete cosine transform(IDCT) circuit 160 which transforms the set of DCT coefficients into a frame difference signal between a block of the current frame and its corresponding block of the previous frame. The frame difference signal from the IDCT circuit 160 is then sent to an image data partitioning circuit 180 for the division thereof.

Figure 4:
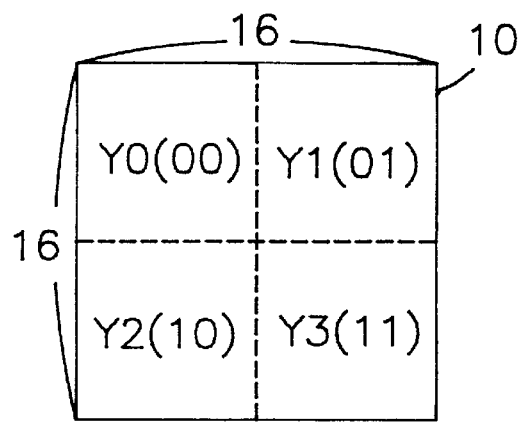
FIG. 4 describes an exemplary macro block which is divided into four equal-sized subblocks.

In accordance with the present invention, the image data partitioning circuit 180 divides the frame difference signal for a current macro block from the IDCT circuit 160 into four current subblocks having the size of 8×8 pixels and provides the divided four subblock data to first-in first-out (FIFO) buffers 210 to 240 for the temporary storage thereof, said four current subblocks forming the current macro block. Referring to FIG. 4, there is shown an exemplary macro block 10 having the size of 16×16 pixels which is divided into four equal-sized subblocks Y0 to Y3 having 8×8 pixels, each subblock having vertical and horizontal block numbers. That is, Y0 to Y3 have the vertical and horizontal block numbers (00), (01), (10) and (11), respectively. The frame difference signal for each of the subblocks Y0 to Y3 is stored in the FIFO buffers 210 to 240 shown in FIG. 1, respectively.

In the meanwhile, the variable length decoded motion vector from the VLD circuit 100 is fed to each of the motion compensation units 330 to 630 through a line L10. Each of the motion compensation units is dedicated to the processing of macro block data bounded by a subblock, and is substantially identical each other. The motion compensation units extract reconstructed previous macro block signals on a subblock by subblock basis from the frame memory modules incorporated therein based on the motion vector and generate the reconstructed previous macro block signals onto lines L22 to L25 as first predicted current macro block signals, respectively. The first predicted current macro block signals on lines L22 to L25 are provided to a formatter 650 and realigned to form second predicted current macro block signals. The realigned second predicted current macro block signals are sent to the adders 320 to 620 through lines L12 to L15, respectively. More detailed descriptions of the motion compensation units and the formatter will be provided hereinafter with reference to FIGS. 2, 6A, 6B and 7. The second predicted current macro block signals on the lines L12 to L15 and the frame difference signals from the FIFO buffers 210 to 240 are summed up at the respective adders 320 to 620 to constitute a reconstructed current frame signal of a given subblock and written onto each memory module in the motion compensation units 330 to 630; and transmitted to a display unit(not shown) through lines L32 to L35 for the display thereof.

Figure 2:
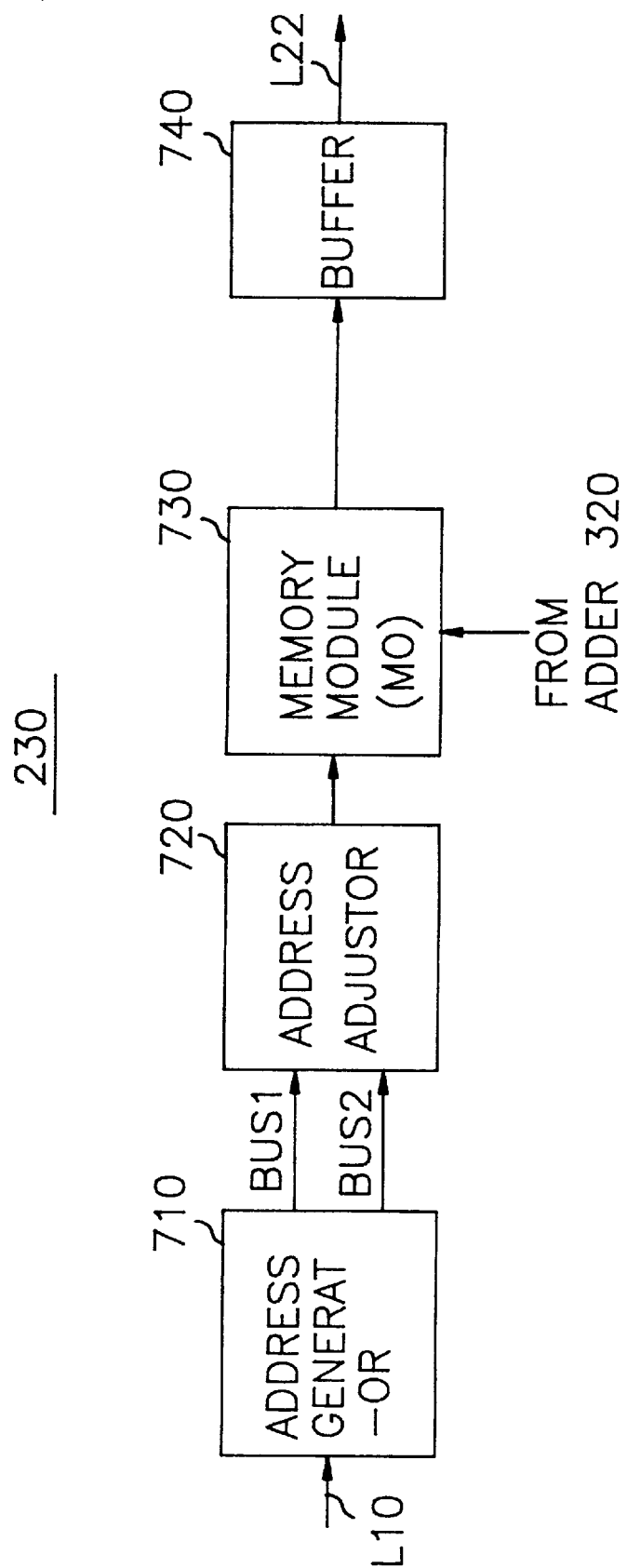
FIG. 2 offers a block diagram illustrating one of the identical motion compensation units shown in FIG. 1.

Referring now to FIG. 2, there is depicted a detailed block diagram illustrating one of the identical motion compensation units, i.e., the motion compensation unit 330 shown in FIG. 1. A motion vector is fed to an address generator 710 through the line L10, wherein the motion vector represents a spatial displacement between a macro block in the current frame and a corresponding matching point, i.e., a most similar block, in the previous frame. Specifically, the matching point for each of the macro blocks is searched in a search region within the previous frame, wherein the search region is defined as a region of a predetermined area which encompasses the position of the corresponding macro block.

Figure 5A:
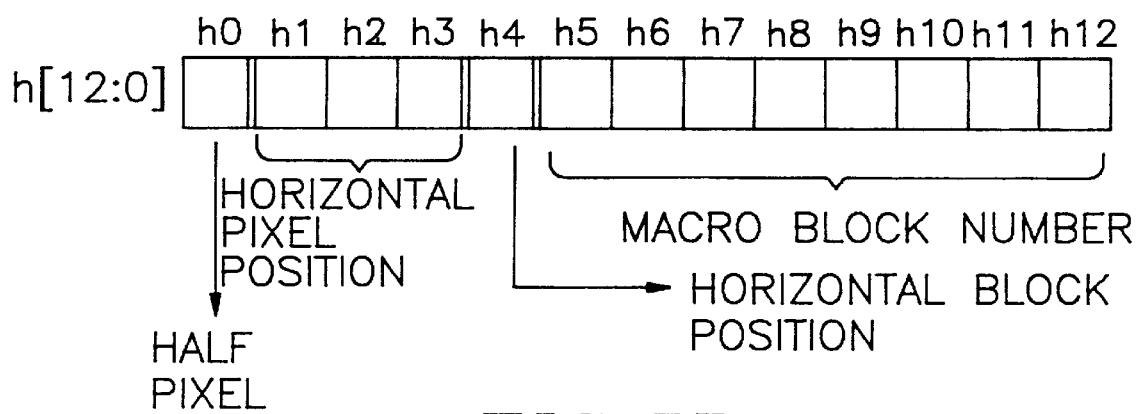
FIGS. 5A and 5B provide horizontal and vertical address representing a motion vector.
Figure 5B:
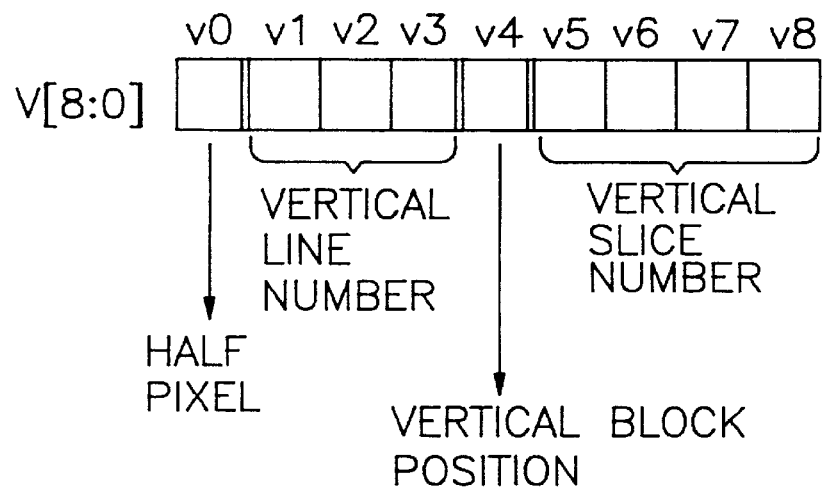

At the address generator 710, the motion vector on the line L10 is processed as well known in the art and a motion vector address having a horizontal and a vertical address components shown in FIGS. 5A and 5B is generated to an address adjustor 720.

As shown in FIGS. 5A and 5B, the horizontal address consists of 13 bits, i.e., h0 to h12 (h[12:0]), wherein bit h0 represents half pixel information, bits h1 to h3, a horizontal pixel position, bit h4, a horizontal block position, and bits h5 to h12, a macro block number. The vertical address is comprised of 9 bits, i.e., v0 to v8 (v[8:0]), wherein bit v0 indicates half pixel information, bits v1 to v3, a vertical line number, bit v4, a vertical block position, and bits v5 to v8, a vertical slice number.

In a preferred embodiment of the present invention, the motion vector address for a macro block within the current frame indicates a left-top corner of a block within the previous frame having the same size as that of the macro block. Referring to FIG. 6, there is depicted an exemplary previous frame 20 having 4×3 macro blocks, wherein the previous frame 20 includes a block 25 having the size of 16×16 pixels, designated by a motion vector MV.

Figure 6A:
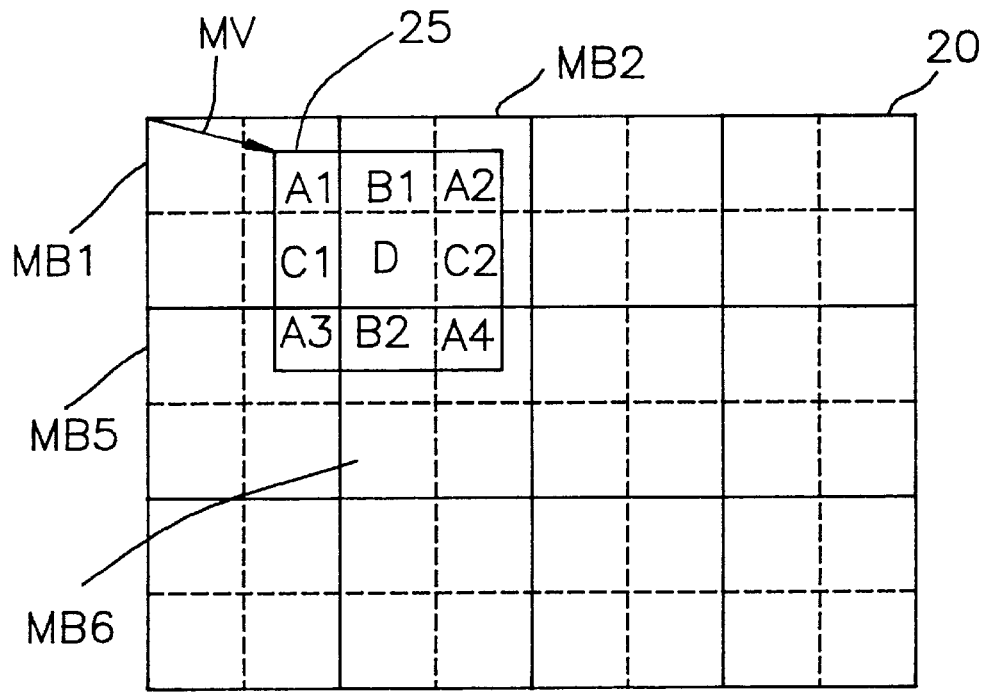
FIG. 6A depicts an exemplary frame having 4×3 macroblocks.
Figure 6B:
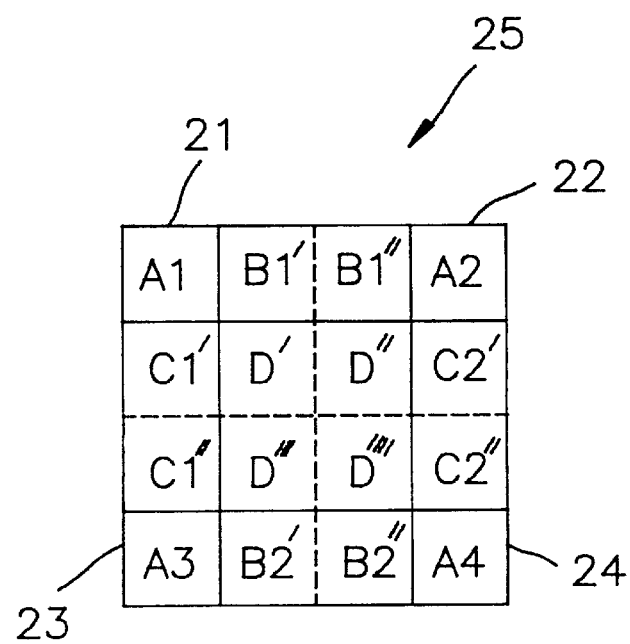
FIG. 6B represents an enlarged view of a given block shown in FIG. 6A.

As shown in FIG. 6A, the motion vector MV indicates the left-top corner of the block 25. The block 25 includes sections A1, C1 within a first macro block MB1, sections B1, A2, D, C2 within a second macro block MB2, section A2 within a fifth macro block MB5 and sections B2, A4 within a sixth macro block MB6, in the previous frame 20, wherein A1 belongs to subblock Y1 in MB1, B1 belongs to Y0 in MB2, C1 belongs to Y3 in MB1 and D belongs to Y2 in MB2; A2 belongs to subblock Y1 in MB2 and C2 belongs to Y3 in MB2; A3 belongs to Y1 in MB5 and B2 belongs to Y0 in MB6; and A4 belongs to Y1 in MB6, as illustrated in FIG. 4. FIG. 6B shows an enlarged view of the given block 25 shown in FIG. 6A, which is divided into four equal-sized blocks 21 to 24 by a dotted line, each of which has four sub-sections belonging to different macro blocks in the previous frame. That is, block 21 includes four sub-sections A1, B1', C1' and D'; block 22 includes sections B1", A2, D" and C2'; block 23 includes sections C1", D'", A3 and B2'; and block 24 includes sections D"", C2", B2" and A4, wherein B' and B1" form section B1; and B2' and B2" form section B2; C1' and C1" form section C1; and C2' and C2" form section C2; and D', D", D'" and D"" form section D.

Figure 7:
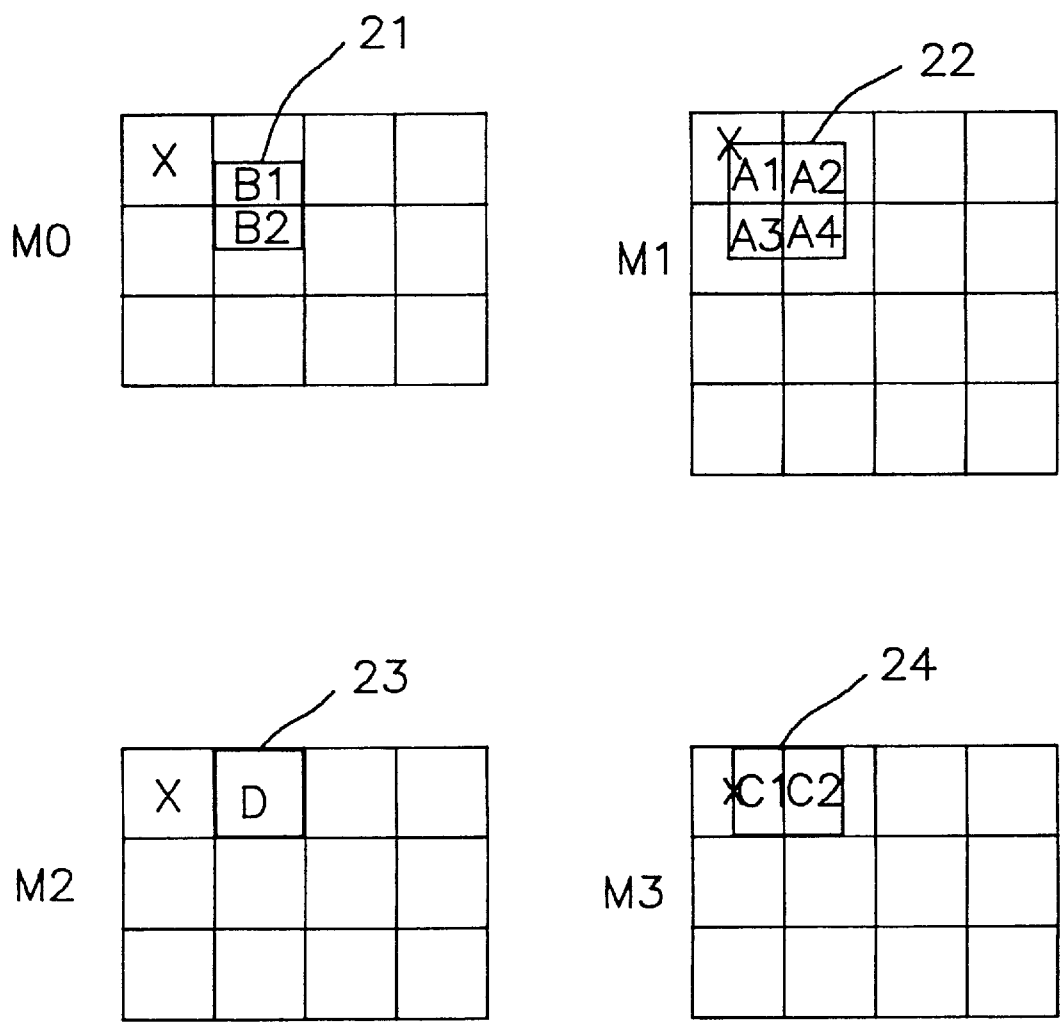
FIG. 7 illustrates four memory modules storing subblock data.

In accordance with the present invention, each of the subblock data within the macro block is stored in each different memory module, which is incorporated in each of the corresponding motion compensation units 330 to 630 shown in FIG. 1. Referring to FIG. 7, there are illustrated four memory modules M0 to M3, each of which stores subblock data corresponding to each subblock of the macro blocks in the previous frame 20. That is, subblock data of subblocks Y0 to Y3 is stored in the memory modules M0 to M3, respectively. For example, sections A1, A2, A3 and A4 belonging to the subblock Y1 of each of the macro blocks MB1, MB2, MB5 and MB6 are stored in the memory module M1; sections B1 and B2 contained in the subblock Y0 of each of the macro blocks MB2 and MB6, the memory module M0; sections C1 and C2 included in the subblock Y3 of each of the macro blocks MB1 and MB2, the memory module M3; and section D contained the subblock Y2 of the macro block MB2, the memory module M2, as shown in FIG. 7.

In the meantime, the motion vector address from the address generator 710 indicates an x-marked position of each of the memory modules M0 to M3 shown in FIG. 7. In this case, even though it is possible to correctly indicate a block 22 in the memory module M1, it is required to adjust the motion vector address for correctly designating blocks 21, 23 and 24 in the memory modules M0, M2 and M3.

In accordance with the present invention, in order to address block 21 in the memory module M0, the macro block number from the horizontal address shown FIG. 5A is incremented by "1" and the horizontal pixel position in the macro block is set to "0". Similarly, in case of the block 23 in the memory module M2, the macro block number is incremented by "1" and both the vertical line number from the vertical address shown in FIG. 5B and the horizontal pixel position from the horizontal address are set to "0"; and in case of the block 24 in the memory module M3, the vertical line number from the vertical address is set to "0".

Referring to FIGS. 8A and 8B, there are provided tables for explaining the adjustment process of the motion vector address. In the tables, BN0 and BN1 represent a vertical and a horizontal subblock numbers, respectively; v4 and h4 represent respective a vertical and a horizontal block positions. The numerals in FIG. 8A represent whether the macro block number and the vertical slice number should be incremented by "1" or not; and the numerals in circles in FIG. 8B represent whether the vertical and the horizontal pixel positions should be set to "0" or not. For example, If v4h4 is 01 and BN0BN1 is 00, numerals 01 and 10 in circles in FIGS. 8A and 8B represent that the macro block number should be incremented by "1" and the horizontal pixel position should be set to "0".

Referring back to FIG. 2, the address adjustor 720 adjusts the motion vector address from the address generator 710 using the vertical and the horizontal subblock numbers N0 and N1, with the bit v4 indicating the vertical block position and bit h4 representing horizontal block position, and generates the adjusted motion vector address to a memory module (M0) 730 (A more detailed description of the address adjustor 720 will be provided hereinafter with reference to FIG. 3).

The reconstructed subblock data in the memory module 730 is retrieved in response to the adjusted motion vector address from the address adjustor 720 and provided to a buffer 740 for the storage thereof. And, the reconstructed current frame signal of a given subblock from the adder 320 shown in FIG. 1 is written in the memory module 730. The buffer 750 temporarily stores the reconstructed subblock data corresponding to sections B1 and B2 shown in FIG. 7 and provides them onto the line L22. Similarly, the motion compensation units 430 to 630 provide the reconstructed current subblock data corresponding to sections A1, A2, A3 and A4 in the block 22, section D in the block 23 and sections C1 and C2 in the block 24 shown in FIG. 7 to the lines L23 to L25, respectively. At the block formatter 650, subblock data from each of the motion compensation units is realigned as shown in FIG. 6B; and, then, predicted current subblock data corresponding to each of the blocks 21 to 24 is provided on the lines L12 to L15, as shown in FIG. 1.

Figure 3:
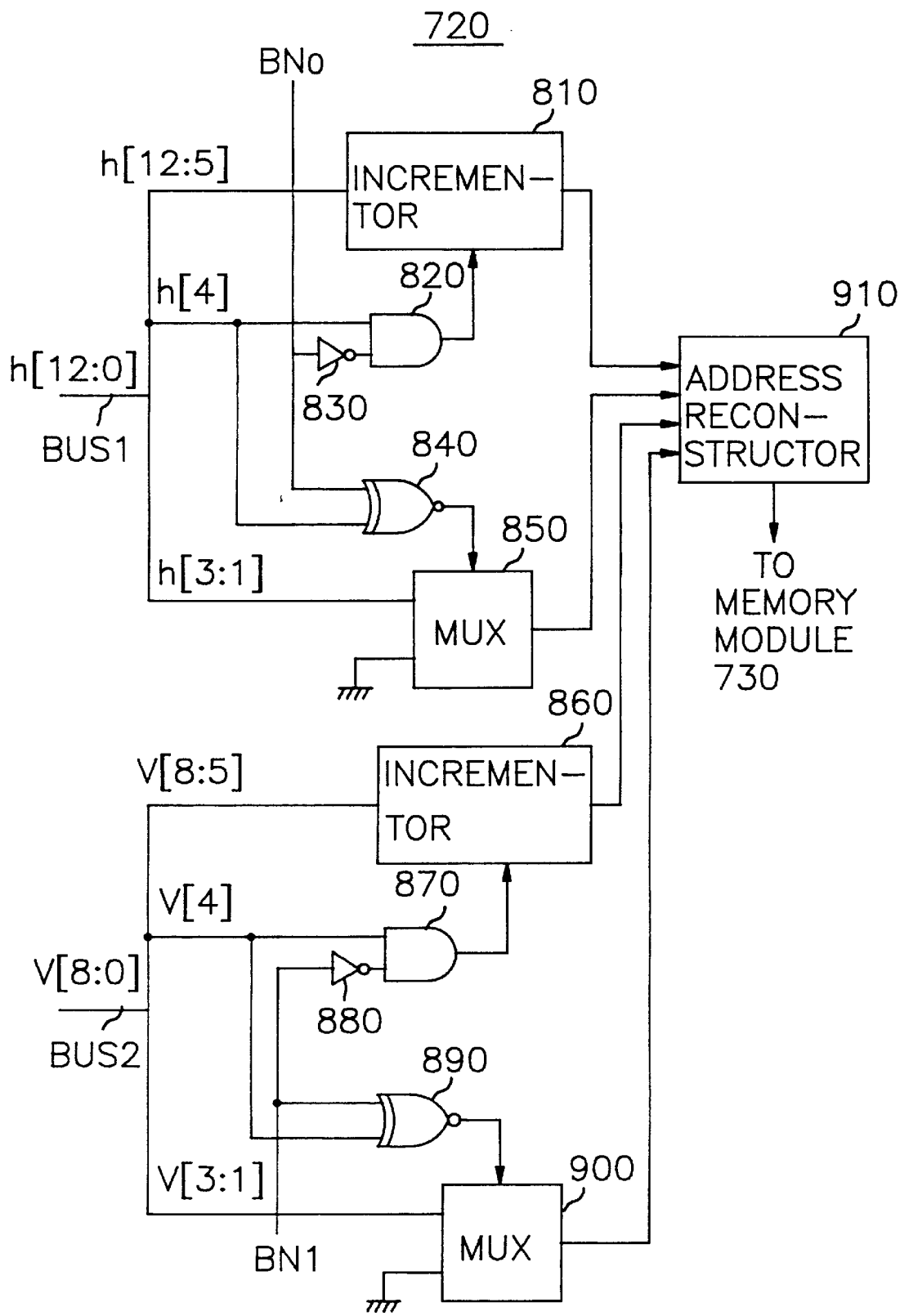
FIG. 3 presents a detailed block diagram illustrating the address adjustor shown in FIG. 2.

Referring now to FIG. 3, there is provided a detailed block diagram illustrating the address adjustor 720 shown in FIG. 2.

As shown in FIG. 3, bit h[4] on a bus BUS1 is applied to an AND gate 820 and an exclusive NOR gate 840 as their input. A vertical subblock number BN0 is also supplied to the AND gate 820 through an inverter 830 and the exclusive NOR gate 840 as their another input. The AND gate 820 performs a logic AND operation for its two inputs and generates a logic low or logic high signal to the incrementor 810, wherein the output of the AND gate 820 is a logic high only if its two inputs are logic high. The exclusive NOR gate 840 performs an exclusive NOR operation for its two inputs and generates a logic low or logic high signal to a multiplexer (MUX) 850, wherein the output of the exclusive NOR gate 840 is a logic high only if both of its two inputs are identical.

The incrementor 810 increments the horizontal bits h[12:5] applied thereto by "1" if the AND gate 820 generates a logic high signal; otherwise, it outputs the h[12:5] directly to an address reconstructor 910. The MUX 850 outputs the horizontal bits h[3:1] applied thereto to the address reconstructor 910 if the exclusive NOR gate 840 generates a logic high signal; otherwise, it provides a logic low signal to the address reconstructor 910.

In the meantime, bit v[4] on a bus BUS2 is applied to an AND gate 870 and an exclusive NOR gate 890 as their input.

A horizontal subblock number BN1 is also supplied to the AND gate 870 through an inverter 880 and the exclusive NOR gate 890 as their another input. The AND gate 870 performs the same operation as the AND gate 820 for its two inputs and generates a logic low or logic high signal to an incrementor 860; and the exclusive NOR gate 890 performs the same function as the exclusive NOR gate 840 for its two inputs and generates a logic low or logic high signal to a MUX 900.

The incrementor 860 increments vertical bits v[8:5] applied thereto by "1" if the AND gate 870 generates a logic high signal; otherwise, it outputs the v[8:5] directly to the address reconstructor 910. The multiplexer 900 outputs the vertical bits v[3:1] applied thereto to the address reconstructor 910 if the exclusive NOR gate 890 generates a logic high signal; otherwise, it provides a logic low signal to the address reconstructor 910. The address reconstructor 910 generates adjusted address data to the memory module 730 for the access thereof.

While the present invention has been described with respect to certain preferred embodiments only, other modifications and variations may be made without departing from the spirit and scope of the present invention as set forth in the following claims.

What is claimed is:

1. A method for decoding an encoded digital video signal for reproduction of an original video image signal, wherein the encoded digital video signal includes encoded frame difference signals between pixels in a current frame and those in a predicted current frame and encoded motion vectors, each of the current and predicted current frames having a number of macro blocks and each of the motion vectors representing a spatial displacement between a macro block in the current frame and a corresponding matching point in a previous frame including a number of previous macro blocks, the method comprising the steps of:

(a) dividing a previous macro block included in the previous frame into four equal-sized previous subblocks;

(b) storing a divided previous subblock data in four storage means;

(c) decoding the encoded frame difference signals to thereby provide a macro block of difference pixel values on a basis of the current macro block;

(d) dividing the macro block of difference pixel values for the current macro block into four equal-sized current subblocks;

(e) storing divided current subblock data in four first-in first-out (FIFO) buffers;

(f) addressing said four storage means to derive predicted current macro block data therefrom in response to a motion vector for said current macro block; and (g) providing a reconstructed current macro block signal as a reconstructed video image signal by combining the predicted current macro block data and the difference pixel data from the FIFO buffers.

2. The method of claim 1, wherein the step (f) includes the steps of:

(f1) generating a motion vector address having horizontal and vertical address components based on the motion vector, wherein the horizontal address has a macro block number and a horizontal block position and the vertical address has a vertical slice number and a vertical block position; and (f1) adjusting the motion vector address by incrementing the macro block number and the vertical slice number by "1", respectively, and setting horizontal and vertical pixel positions to "0", respectively.

3. An apparatus for decoding an encoded digital video signal for the reproduction of an original video image signal, wherein the encoded digital video signal includes encoded frame difference signals between pixels in a current frame and those in a predicted current frame and encoded motion vectors, each of the current and predicted current frames having a number of macro blocks and each of the motion vectors representing a spatial displacement between a macro block in the current frame and a corresponding matching point in a previous frame, said apparatus comprising:

means for decoding the encoded frame difference signals and the encoded motion vectors to thereby provide motion vectors and a macro block of difference pixel values on the basis of a current macro block having N×N pixels, N being a positive integer;

means for dividing the macro block of difference pixel values for the current macro block into N×N/M×M number of equal-sized difference subblocks, each difference subblock having M×m pixels and M being a positive integer smaller than N;

N×N/M×M number of first-in first-out (FIFO) buffers for storing divided difference subblock data;

motion compensation means for extracting a reconstructed current macro block signal based on the divided difference subblock data and a corresponding motion vector, thereby providing a reconstructed current macro block signal as a reconstructed video image signal, wherein the motion compensation means includes N×N/M×M number of local memories for generating a predicted current macro block data based on a corresponding motion vector, each local memory for storing predetermined previous subblock data of each previous macro block contained in the previous frame.

4. The apparatus of claim 3, wherein the motion compensation means includes:

N×N/M×M number of addressing means for providing the reconstructed current macro block signal by combining the predicted current macro block data and the difference subblock data from the FIFO buffers;

N×N/M×M number of motion compensation units, each having a local memory, for extracting predicted section data based on the corresponding motion vector from the local memory; and formatter means for realigning N×N/M×M number of predicted section data to form the predicted current macro block data.

5. The apparatus of claim 4, wherein said each motion compensation unit includes addressing means for addressing the local memory to derive the predicted section data therefrom in response to the corresponding motion vector.

6. The apparatus of claim 5, wherein the addressing means includes:

address generator for generating, in response to the corresponding motion vector, a motion vector address having horizontal and vertical address components, wherein the horizontal address component has a macro block number, a horizontal pixel position and a horizontal block position, and the vertical address component has a vertical slice number, a vertical line number and a vertical block position; and address adjusting means for adjusting the motion vector address by incrementing the macro block number and the vertical slice number by "1", respectively, and setting the horizontal and the vertical pixel positions to "0", respectively.

7. The apparatus of claim 6, wherein the address adjusting means includes:

horizontal address adjusting means for incrementing, in response to a vertical subblock number and the horizontal block position, the macro block number by "1" or not and for setting the horizontal pixel position to "0" or not; and vertical address adjusting means for incrementing, in response to a horizontal subblock number and the vertical block position, the vertical slice number by "1" and for setting the vertical line number to "0".

8. The apparatus of claim 7, wherein, if the vertical subblock number is "0" and the horizontal block position is "1", the macro block number is incremented by "1" and the horizontal pixel position is set to "0".

9. The apparatus of claim 8, wherein if the horizontal subblock number is "0" and the horizontal block position is "1", the vertical slice number is incremented by "1" and the vertical line number is set to "0".

10. The apparatus of claim 9, wherein said N is 16 and said M is 8.

* * * * *